United States Patent

Bish et al.

(10) Patent No.: US 7,039,657 B1
(45) Date of Patent: May 2, 2006

(54) METHOD, SYSTEM, AND PROGRAM FOR ACCESSING DATA FROM STORAGE SYSTEMS

(75) Inventors: Thomas William Bish, Tucson, AZ (US); Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,506

(22) Filed: Nov. 9, 1999

(51) Int. Cl.
   *G06F 17/30* (2006.01)

(52) U.S. Cl. .................... 707/203; 707/10; 711/166
(58) Field of Classification Search ............... 707/1–10, 707/100–104.1, 200–205; 711/166, 163.15, 711/111–113, 133–151, 163; 710/74; 709/227, 709/104–105
   See application file for complete search history.

(56) References Cited

U.S. PATENT DOCUMENTS

| | | | | |
|---|---|---|---|---|
| 4,507,751 A | * | 3/1985 | Gawlick et al. ............ 707/202 |
| 5,251,308 A | * | 10/1993 | Frank et al. ................ 711/163 |
| 5,325,505 A | * | 6/1994 | Hoffecker et al. .......... 707/101 |
| 5,522,090 A | * | 5/1996 | Tanaka et al. ................ 710/74 |
| 5,542,064 A | * | 7/1996 | Tanaka et al. .............. 711/114 |
| 5,765,172 A | | 6/1998 | Fox |
| 6,041,394 A | * | 3/2000 | Halligan et al. ............ 711/166 |
| 6,272,605 B1 | * | 8/2001 | Le et al. ..................... 711/151 |
| 6,493,796 B1 | * | 12/2002 | Arnon et al. ................ 711/114 |

OTHER PUBLICATIONS

Weikum et al., "Dynamic file allocation in disk arrays", 1991, ACM Press NY, USA, pp. 406–415.*

* cited by examiner

*Primary Examiner*—Mohammad Ali
(74) *Attorney, Agent, or Firm*—David W. Victor; Konrad Raynes & Victor LLP (57) ABSTRACT

Disclosed is a system, method, and program for accessing a data set, e.g., volume, file, from one of two storage devices. Each storage device includes a copy of the data set. A flag is maintained for each storage device indicating whether a previous access attempt of the data set from the storage device failed. The storage device having the flag indicating that no previous access attempt failed is selected if the flag for the other storage device indicates that one previous access attempt of the data set from the storage device failed. The data set is accessed from the selected storage device.

24 Claims, 5 Drawing Sheets

METHOD, SYSTEM, AND PROGRAM FOR ACCESSING DATA FROM STORAGE SYSTEMS

BACKGROUND OF THE INVENTION

1. Field of the Invention

The present invention relates to a system, method, and program for accessing data from one of two storage devices maintaining a copy of the data and, in particular, selecting one of the storage devices from which to recall a data set.

2. Description of the Related Art

In the prior art, a virtual tape storage system, hard disk drive storage is used to emulate tape drives and tape cartridges. In this way, host systems performing input/output (I/O) operations with respect to tape are in fact performing I/O operations with respect to a set of hard disk drives emulating the tape storage. In the prior art International Business Machines (IBM) Magstar Virtual Tape Server, one or more virtual tape servers are each integrated with a tape library comprising numerous tape cartridges, tape drives, and with a direct access storage device (DASD) comprised of numerous interconnected hard disk drives. The virtual tape server is transparent to the host. The host makes a request to access a tape volume. The virtual tape server intercepts the tape requests and accesses the volume in the DASD. If the volume is not in the DASD, then the virtual tape server recalls the volume from the tape drive to the DASD. The virtual tape server can respond to host requests for volumes in tape cartridges from DASD substantially faster than responding to requests for data from a tape drive. Thus, the DASD functions as a tape volume cache for volumes in the tape cartridge library.

In the prior art, two virtual tape servers, each integrated with a separate tape library, can provide access and storage for the same data volumes. By providing two virtual tape servers and two libraries, if an operation to recall a file from one virtual tape server and tape library fails, then the file may still be recalled from the other virtual tape server and tape library. This redundant architecture provides greater data and tape availability and improved data shadowing in the event a tape in one system is damaged. In prior art systems, Enterprise System Connection (ESCON)** channels can provide communication from numerous hosts to the virtual tape servers. Each ESCON channel in the system has one or more virtual tape controllers that select a virtual tape server to handle the host I/O request.

**AIX, ESCON, Magstar, and RS/6000 are registered trademarks of IBM.

In the prior art, each virtual tape server includes a token database including control information for each volume in the tape library. The token database would indicate a data level for each volume and whether the volume is valid. During operations, the virtual tape servers perform synchronization operations to ensure that both virtual tape servers include the most recent version of data. A prior art virtual tape server receiving an update to a volume will increase the data level in the token for the updated volume. Thus, the prior art virtual tape server receiving the update will have a higher level for a volume than the virtual tape server that did not receive an update. During update operations, the valid flags in both the virtual tape servers' tokens for the volume are set to invalid to prevent access to the volume while it is being updated. If the virtual tape controller receives a host data request and one virtual tape server has a higher data level version of the requested file than the other server, then the virtual tape controller will select the virtual tape server having the highest data level. After data is synchronized in the prior art between virtual tape servers; the virtual tape servers will each include the same data, have their data levels set equal, and have their valid flag set.

Prior art techniques will sometimes not select the virtual tape server most likely to be capable of providing access to valid data. Thus, there is a need in the art for improved mechanisms for providing access to data when two virtual data servers are used.

SUMMARY OF THE PREFERRED EMBODIMENTS

To overcome the limitations in the prior art described above, preferred embodiments disclose a method, system, and program for accessing a data set from one of two storage devices. Each storage device includes a copy of the data set. A flag is maintained for each storage device indicating whether a previous access attempt of the data set from the storage device failed. The storage device having the flag indicating that no previous access attempt failed is selected if the flag for the other storage device indicates that one previous access attempt of the data set from the storage device failed. The data set is accessed from the selected storage device.

In further embodiments, the data set is accessed from one of a third and fourth storage devices if the data set is in one of the third and fourth storage devices. In such case, the steps of selecting one of the first and second storage devices and accessing the data from one of the first and second storage devices occurs if the data set is not in one of the third and fourth storage devices. The data set from the first storage device is copied to the third storage device when accessing the data set from the first storage device and the data set from the second storage device is copied to the fourth storage device when accessing the data set from the second storage device.

In still further embodiments, the step of accessing the data set comprises recalling the data set and the flag indicates whether a recall attempt of the data failed. A operation is scheduled to copy the data set from the third storage device to the first storage device. After scheduling the operation, a request is received to access the data set. The data set is recalled from the third storage device if the scheduled operation has not yet copied the requested data set to the first storage device. In such case, the steps of selecting one of the first and second storage devices to access the data set and accessing the data set occurs if the scheduled operation of the data set to the first storage device completed.

Preferred embodiments provide a program mechanism to select a storage device from multiple storage devices to access a data set that has the greatest likelihood of successfully completing the access request. For this purpose, a flag is maintained for each storage device and the data sets therein, e.g., volume, file, etc., indicating whether an access attempt of the data set at the storage device failed. If the flag for one storage device indicated an access attempt did not fail and the flag for the data set at the other storage device indicates an access attempt failed, then the system will access the data set from the storage device that has not yet failed. In this way, preferred embodiments provide a program mechanism for selecting among multiple storage devices the one storage device that is most likely to successfully perform the requested access attempt, e.g., a recall attempt of a volume from a tape cartridge.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

How Prior Art Systems Handle Failure of A Recall Attempt

In the prior art IBM systems including two virtual tape server systems, if a virtual tape server receives a request for a file that must be recalled from the tape library and the tape fails, then the host will again attempt to obtain the data or redrive the recall operation as the host process may need the data to continue its operations. If both the volumes in both virtual tape servers have the same data level, then it is possible that the virtual tape controller would select the same virtual tape server that previously failed the recall request, as opposed to the other virtual tape server that has not yet failed the request. If the failure of the recall request is a result of a problem specific to the tape library, then it is highly likely that the file may be accessed immediately from the tape library of the other virtual tape server that has not failed the recall request. However, prior art may continue to attempt recalling the volume from the failed virtual tape server and not attempt the recall through the other virtual tape server which has not yet failed a recall attempt.

Thus, there is a need in the art for an improved method, system, and program for selecting a virtual tape server that is less likely to fail a recall request.

Preferred Embodiments

Figure 1:
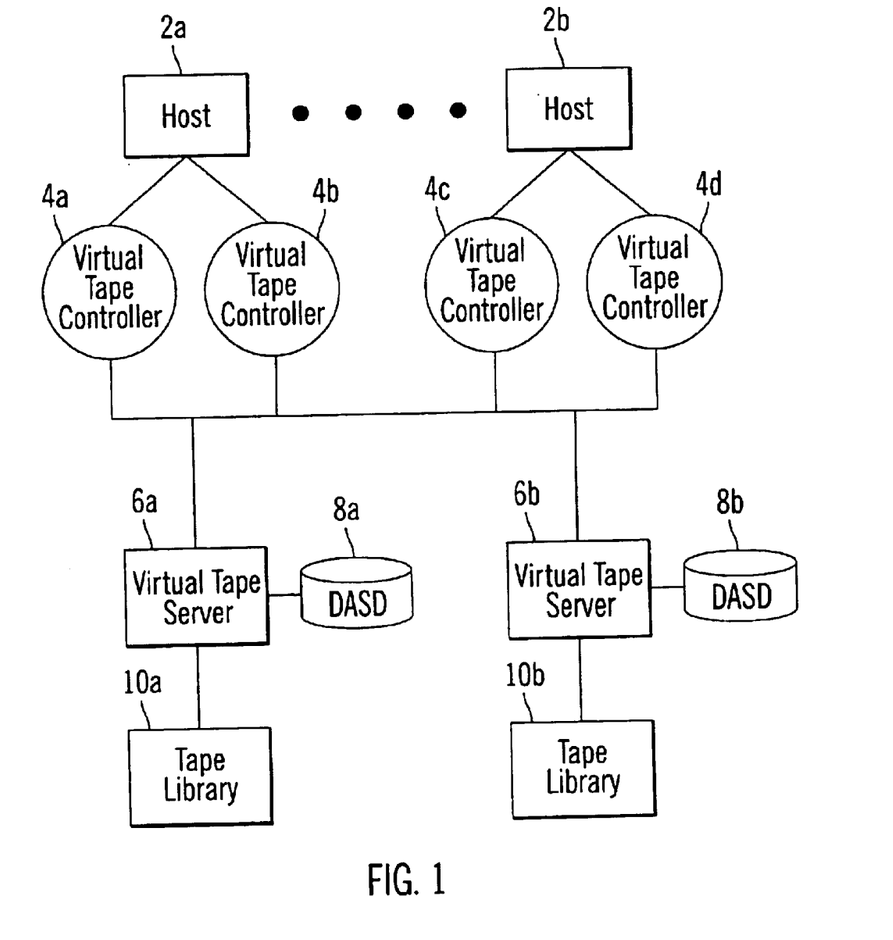
FIG. 1 is a block diagram illustrating a computing environment in which preferred embodiments are implemented.

FIG. 1 illustrates a computing environment utilizing two virtual tape servers. A plurality of host systems 2a, b connect through ESCON channels to virtual tape controllers 4a, b, c, and d. The virtual tape controllers 4a, b, c, d route I/O requests from the hosts 2a, b to virtual tape servers 6a or 6b. The virtual tape servers 6a and 6b control access to direct access storage devices (DASD) 8a and 8b and tape libraries 10a and 10b, respectively. Each DASD 8a, b comprises numerous interconnected hard disk drives. Each tape library 10a, b comprises numerous tape cartridges which may be mechanically loaded into tape drives that the virtual tape servers 6a, b may access. The hosts may include an operating system such as the IBM OS/390 operating system, or any other operating system known in the art. The virtual tape servers 6a or 6b may comprise a server system including software to emulate a tape library, such as the IBM Magstar Virtual Tape Server. For instance, the virtual tape servers 6a, b and virtual tape controllers 4a, b, c, d may be implemented in separate computers comprising an IBM RS/6000 processor, the IBM AIX operating system, and the IBM ADSTAR Distributed Management (ADSM) software or Tivoli Storage Manager, to perform the data movement operations among the hosts 4a, b, DASDs 8a, b, and tape libraries 10a, b.** The tape library may comprise an IBM Magstar Tape Library, such as the Magstar 3494 Tape Library, or any other tape library system known in the art.

The DASDs 8a, b provide a tape volume cache, which extends the performance benefits of disk cache to access the volumes in the tape libraries 10a, b and improves performance by allowing host I/O requests to be serviced from the DASDs 8a, b. The virtual tape servers 6a, b appear to the hosts 2a, b as virtual tape drives including tape data volumes. The hosts 2a, b view the virtual volumes as actual tape volumes and issue tape management commands, such as mount, and otherwise address the virtual tape servers 6a, b as a tape control unit. Further details of the virtual tape server technology in which preferred embodiments are implemented are described in the IBM publication "Enhanced IBM Magstar Virtual Tape Server: Implementation Guide." IBM document no. SG24-2229-02 (Copyright IBM, April, 1999), which publication is incorporated herein by reference in its entirety.

Volumes maintained in tape cartridges in the tape library 10a, b are logical volumes. A copy of the logical volume in the virtual tape server 6a, b is called a virtual volume. After the DASDs 8a, b space usage reaches a threshold amount, the virtual tape server 6a, b would schedule to destage virtual volumes in the DASDs 8a, b to the tape library 10a, b. Once a volume is scheduled for destage, it is closed or virtually dismounted. After being scheduled for destage, the virtual volume in the virtual tape servers 6a, b cannot be overwritten until it is copied to tape. If a host 2a, b requests a volume that only resides in tape, then the logical volume must be recalled and copied from tape to a virtual volume in the DASDs 8a, b. Recall operations can take several minutes and may include mechanical operations concerning the use of a robotic arm to access tape cartridges from the storage cells and insert into a tape drive, mounting the tape cartridge, rewinding the tape, etc. In preferred embodiments, the tape libraries 10a, b include the same data volumes, thus shadowing each other. However, each virtual tape server 6a, b behaves independently, and each may cache different volumes in DASD. For instance, the virtual tape servers 6a, b may have different virtual volumes as a result of different schedules for writing virtual volumes to the tape libraries 10a, b.

If a virtual volume is scheduled for destage and then accessed again within a short time, the virtual volume may still reside in the DASDs 8a, b waiting to be copied from the DASD 8a, b to the tape library 10a, b. Even though the volume is virtually dismounted, the virtual tape server 6a, b can still virtually mount the closed volume that still remains in DASD 6a, b. By allowing a volume to be mounted and read from DASD 8a, b, delay times associated with rewinding the tape, robotic arm movement, and load time for the mounts are avoided. Performing a virtual mount of a closed volume remaining in DASD 8a, b is referred to as a cache hit, as the volume may be mounted from the tape virtual cache (DASDs 8a, b).

Figure 2:
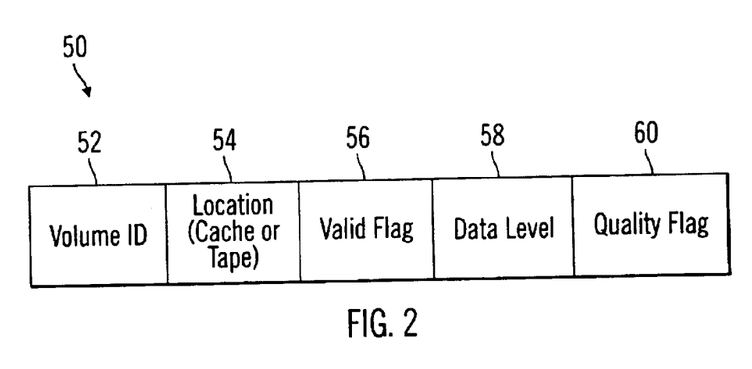
FIG. 2 illustrates a token database record used to access data in accordance with preferred embodiments of the present invention.

Each virtual tape server 6a, b includes a database of tokens or records for every volume in the tape library 10a, b. FIG. 2 illustrates the fields or data maintained in each volume token. The volume ID 52 indicates the identity of the volume. A location field 54 indicates whether the volume is in the virtual tape server 6a, b or only in the tape library 10a, b. The location field 54 would indicate that a volume is in the DASD 6a, b even if it scheduled for destage. A valid flag indicates whether the data is valid. The valid flag 56 is set "invalid" for a volume in one virtual tape server 6a if the other virtual tape server 6b is updating the volume in the DASD 8b. After a volume has been updated at one virtual tape server 6a, the valid flag is set "valid" or "on" again. A data level 58 indicates the number of times the file has been updated since the last time the volumes in the DASDs 8a, b were synchronized. Every time data is updated to a virtual volume, the level field 58 is incremented indicating the number of times a volume in a particular DASD 8a, b has been updated. The volume in the DASDs 8a, b having the highest data level includes the most recent version of the update. For this reason, the virtual tape server 6a, b including the most recent version of the data, i.e., having the highest level, will be selected when performing I/O operations with respect to the volume. A quality flag 60 indicates whether a recall attempt of a volume failed for a particular virtual tape server 6a, b.

Figure 3:
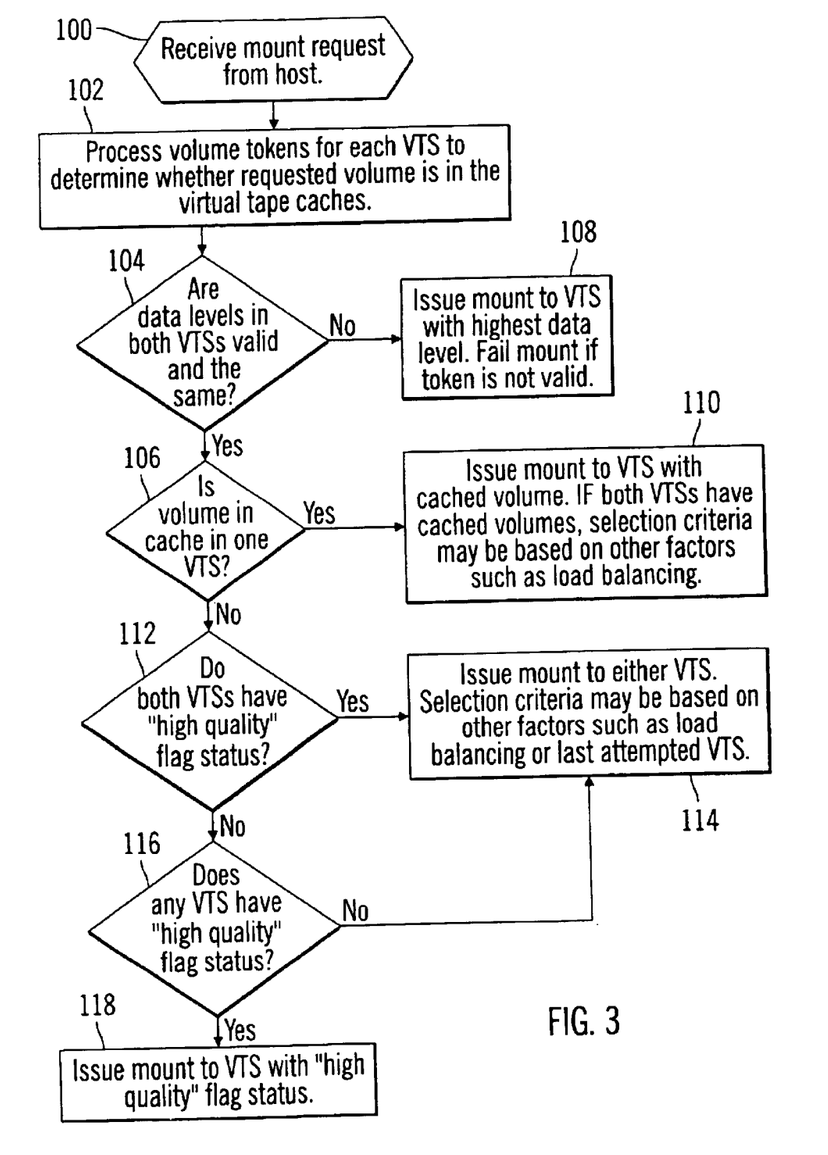
FIG. 3 illustrates logic to process a request to mount a volume in accordance with preferred embodiments of the present invention.

FIG. 3 illustrates logic implemented in the directors 4a, b, c, d to select a virtual tape server to handle a mount request and subsequent I/O request. Control begins at block 100 with one virtual tape controller 4a, b, c or d receiving a mount request from one host 2a, b. The virtual tape controller 4a, b, c or d processes (at block 102) the volume tokens in each virtual tape server 6a, b (VTS) to determine whether the requested volume is in the virtual tape cache (DASDs 8a, b). As discussed, a virtual volume may remain unmounted and closed in the DASDs 8a, b before being written to the tape libraries 10a, b. If the data levels in both virtual tape servers 6a, b are not valid or not the same (at block 104), then the virtual tape controller 4a, b, c or d issues (at block 108) a mount to the virtual tape server 6a or b having the highest data level. The mount is failed if the token is not valid. Otherwise if the data levels in both virtual tape servers 6a, bare the same and valid, then the virtual tape controller 4a, b, c or d determines (at block 106) whether the volume to mount is in one virtual tape server 6a, b, i.e., the cache. If so, then the virtual tape controller 4a, b, c or d issues (at block 110) a mount to the virtual tape server 6a, b with the cached volume. If both virtual tape servers 6a, b have cached volumes, then the virtual tape controller 4a, b, c or d may use a selection criteria such as load balancing (e.g., the virtual tape server least busy), round robin, etc., to select one virtual tape server 6a, b from which to mount the volume. Such selection criteria would be unrelated to the value of the flags.

If the volume is not in either cache, then the virtual tape controller 4a, b, c or d determines (at block 112) whether both virtual tape servers 6a, b have a quality flag 60 value of "high." If so, then the virtual tape controller 4a, b, c or d issues (at block 114) a mount to either virtual tape server 6a or b based on selection criteria unrelated to the flag values. Otherwise, if both virtual tape servers 6a, b do not have "high" quality flags 60, then a determination is made (at block 116) whether one of the virtual tape servers 6a or b has the "high" quality flag 60 value. If one virtual tape server 6a or b has a quality flag 60 value of "high", then the virtual tape controller 4a, b, c or d issues (at block 118) the mount request to the virtual tape server 6a or b having the "high" quality flag 60 value. Otherwise, if neither virtual tape server 6a or b has a "high" quality flag 60 value, then control proceeds to block 114 to select a virtual tape server 6a, b according to criteria, e.g., load balancing, round robin, etc., unrelated to the flags.

Figure 4:
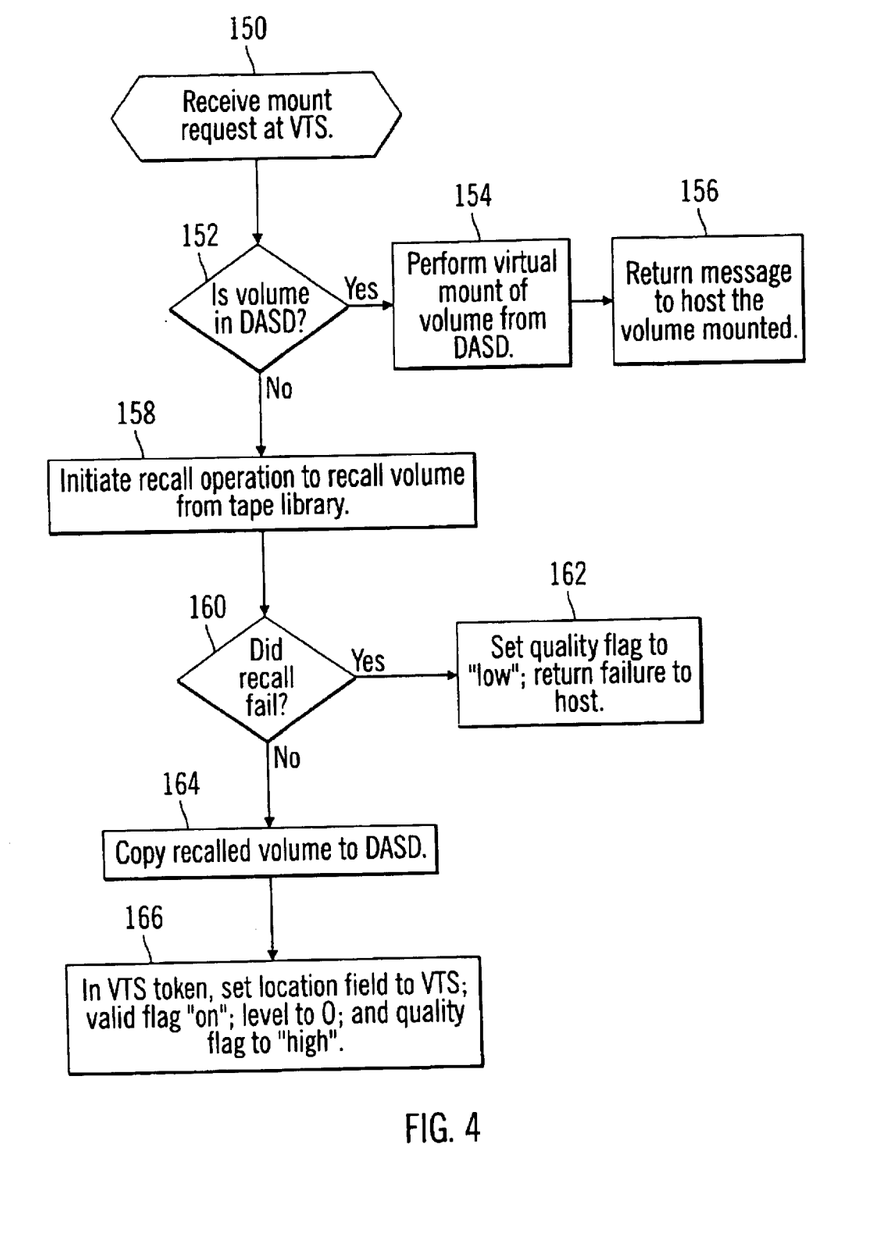
FIG. 4 illustrates logic to recall a volume in accordance with preferred embodiments of the present invention.

FIG. 4 illustrates logic implemented in the virtual tape servers 6a, b to process a recall request to the volume. Control begins at block 150 with one virtual tape server 6a or b receiving a mount request. The virtual tape server 6a or b then determines (at block 152) whether the volume to recall is still in DASD 8a or b, i.e., is closed and virtually dismounted, but not yet written to the tape library 10a orb. If the volume is in DASD 8a or b, then the virtual tape server 6a or b performs (at block 154) a virtual mount of the volume from DASD 8a or b and sends (at block 156) a return message to the host 2a, b that the volume is mounted.

If the volume is not in DASD 8a or b, then the virtual tape server 6a or b initiates (at block 158) a recall operation to recall the volume from the tape library 10a or b. If the recall failed (at block 160), then the virtual tape server 6a or b sets (at block 162) the quality flag 60 to low for the virtual volume in the virtual tape server 6a or b, and then returns a recall failed message to the host. A recall may fail as a result of a cartridge being unavailable, e.g., not in its expected storage cell in the tape library 10a or having permanent read errors. If the recall was successful, then the virtual tape server 6a or b copies (at block 164) the recalled logical volume to a virtual volume in the DASD 8a or b. After recalling the volume, the virtual tape server 6a or b sets (at block 166) the location field 54 to virtual tape server and the quality flag 60 to "high". The virtual tape server 6a or b recalling the volume may then synchronize with the other virtual tape server 6a or b and copy the recalled volume to the virtual tape server 6a or b.

Further, if an attempt to recall a volume fails from the DASD 8a, b as a result of read errors in the disk drive, then the virtual tape server 6a, b may set the quality flag for the volume to "low" to cause the virtual tape controller 4a, b, c, d to retry the recall from the other virtual tape server 6a, b, which is more likely to successfully recall the volume.

With the logic of FIGS. 3 and 4, if a first recall attempt fails, then the quality flag 60 for the virtual tape server, e.g., 6a, having the failure is set to "low". This causes the virtual tape controller 4a, b, c, and d to select the virtual tape server, e.g., 6b, having a quality flag of high. The next time the recall is attempted, the director selects the virtual tape server that has not yet failed the recall and that is highly likely to successfully complete the recall as the probability that a recall will fail to both the tape library systems is low. Thus, the preferred logic avoids the situation, without the quality flag, where the director may continue to randomly select the virtual tape server 6a that produced the failed recall when the other virtual tape server has not failed. Instead, with preferred embodiments, the virtual tape controller 4a, b, c or d selects a virtual tape server 6b having a quality flag 60 of "high" over another virtual tape server 6a that suffered a failed recall. If both quality flags 60 are the same, i.e., "low" or "high", then there is no benefit to selecting one of the virtual tape servers 6a and b over the other as both are in the same state with respect to the likelihood of completing the recall. In such case, a virtual tape server is selected using criteria such as load balancing, round robin, last accessed virtual tape server or other criteria, or a tape server is randomly selected. Thus, preferred embodiments provide a software mechanism to ensure that the virtual tape server 6a or b most likely capable of executing a successful recall is selected. A failed recall may result because a tape is unavailable, mechanical problems with the tape libraries 10a, b, permanent errors in the tape, etc.

After mounting the virtual volume, the virtual tape server 6a or b performing the mount would then handle the subsequent read/write operation to the virtual volume.

Figure 5:
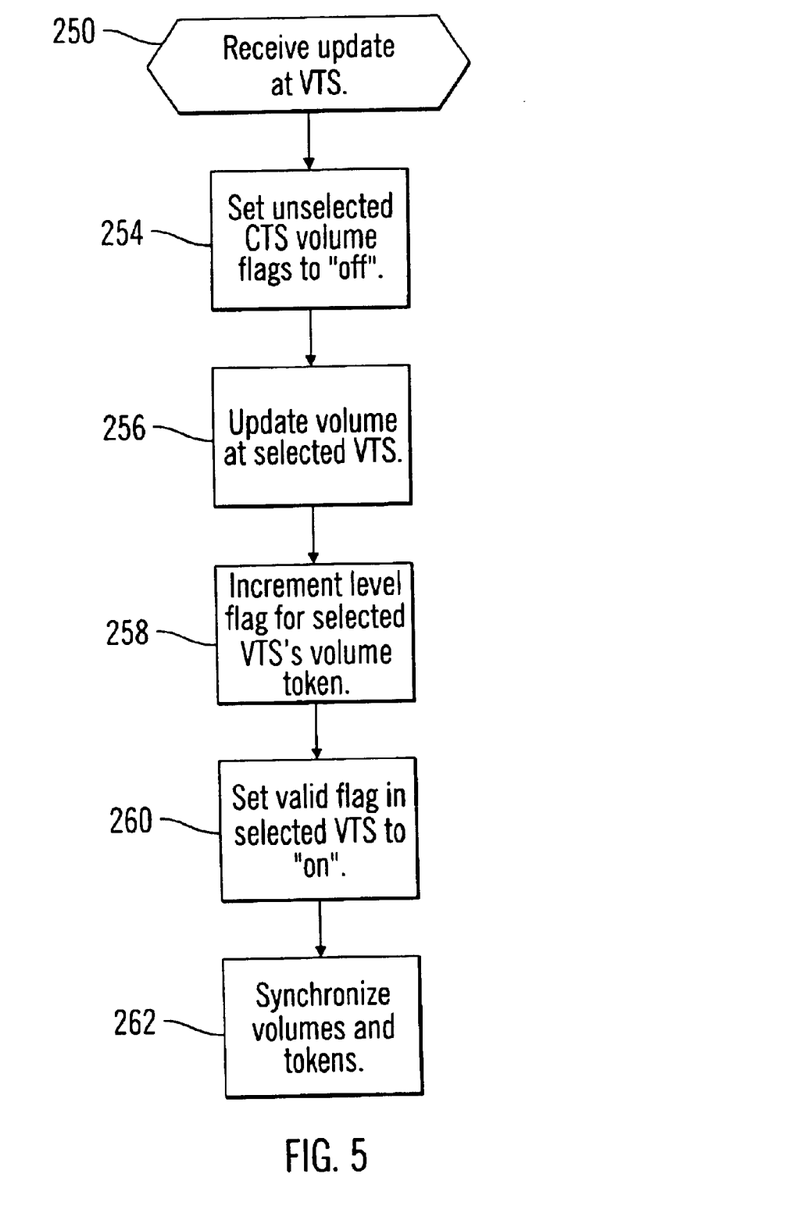
FIG. 5 illustrates logic to update data at a volume in accordance with preferred embodiments of the present invention.

FIG. 5 illustrates logic implemented in the virtual tape servers 6a, b to process an update request. Control begins at block 250 with a virtual tape server 6a, b, selected according to the logic in FIG. 5, receiving an update to a mounted virtual volume. The virtual tape server 6a or b then sets (at block 254) the valid flag 56 "off" for the volume token of the virtual tape server 6a, b that was not selected and then updates (at block 256) the volume at the selected virtual tape server 6a or b. The virtual tape server 6a or b then increments (at block 258) the level flag 58 and sets (at block 222) the valid flag "on" for the volume token of the selected virtual tape server 6a or b. The valid flag 56 remains "off" for the virtual tape server 6a or b that was not selected until the update is synchronized at the other virtual tape server 6a or b. For the period of time that the update to a volume in one DASD 8a or b is not copied over to other volume, the levels would remain different.

A read operation would proceed by having the virtual tape controller 4a, b, c, d select a virtual tape server 6a or b using the logic of FIG. 5 to handle the read operation. The selected virtual tape server 6a or b would then return the requested data to the virtual tape controller 4a, b, c or d to return to the host 2a, b.

Preferred embodiments provide a volume tokens to indicate the status of volumes at two different virtual tape servers 6a, b. This token is used to select a virtual tape server 6a, b to perform the access operation. Further, this token includes a quality field which enables the virtual tape controller 4a, b, c, d to select the virtual tape server 6a, b to perform a recall operation from a tape cartridge that is most likely to successfully recall the volume from the tape library 10a, b. This is an improvement over current methods which continue to randomly select a virtual tape server 6a, b to handle the update even though one of the virtual tape servers 6a or b failed the recall.

CONCLUSION

This concludes the description of the preferred embodiments of the invention. The following describes some alternative embodiments for accomplishing the present invention. The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Preferred embodiments were described with respect to the IBM virtual tape server system. However, the preferred logic could apply to any virtual storage system in which a faster storage system, including either magnetic storage or memories, is used to cache data from a slower storage system. For instance, the cache may comprise memory devices and the storage devices may comprise sets of hard disk drives whose data sets are paged into the corresponding memory sets to provide access to the data sets through the faster access cache.

Preferred embodiments were described with respect to recalling, mounting, and maintaining tokens for data volumes. However, any data set or unit of data storage such as files, tracks, fixed blocks, etc., could be the subject of the recalling and mounting operations. The term "data set" as used herein refers to any unit of data storage.

In preferred embodiments, virtual tape controllers were used to select a virtual tape server to handle the recall or I/O access operation. In alternative embodiments, the hosts may make such a selection, or the virtual tape servers may determine which virtual tape server to use to handle the recall or access operation.

Preferred embodiments were described with respect to determining a virtual tape system to select to process a recall request. In alternative embodiments, the data access request may comprise access requests other than recall requests.

In summary, preferred embodiments disclose a system, method, and program for accessing a data set from one of two storage devices. Each storage device includes a copy of the data set A flag is maintained for each storage device indicating whether a previous access attempt of the data set from the storage device failed. The storage device having the flag indicating that no previous access attempt failed is selected if the flag for the other storage device indicates that one previous access attempt of the data set from the storage device failed. The data set is accessed from the selected storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing a plurality of data sets from one of a first, second, third and fourth storage devices, including a copy of the data set, comprising:

maintaining a flag for each of the first and second storage devices indicating whether a previous access attempt of the data set from the first and second storage devices failed;

maintaining a data level for each of the plurality of data sets in each of the first and second storage devices indicating a number of times the data set has been updated, wherein there is a separate data level for each copy of one data set in the first and second storage devices and wherein the data levels for the first and second storage devices having copies of one data set are capable of being equal;

receiving a request to one data set;

accessing the data set from one of the third and fourth storage devices if the data set is in one of the third and fourth storage devices;

selecting the first or second storage device having a higher data level for the requested data set if the data levels are not equal and if the data set is not in one of the third and fourth storage devices;

selecting the first or second storage device having the flag indicating that no previous access attempt failed if the flag for the other of the first or second storage device indicates that one previous access attempt of the data set from the first or second storage device failed and if the data levels are equal and if the data set is not in one of the third and fourth storage devices;

accessing the data set from the selected first or second storage device;

copying the data set from the first storage device to the third storage device when accessing the data set from the first storage device; and copying the data set from the second storage device to the fourth storage device when accessing the data set from the first storage device.

2. The method of claim 1, further comprising using a selection criteria to access one of the first and second storage devices that is unrelated to a value of the flag if the flags for both storage devices have the same value.

3. The method of claim 1, further comprising synchronizing the data set on both the first and second storage devices after accessing the data set from the selected storage device.

4. The method of claim 1, where the flag and data level are maintained for each data set in the first and second storage devices and wherein the first and second storage devices have the same data sets.

5. The method of claim 1, wherein the step of accessing the data set comprises recalling the data set and whey the flag indicates whether a recall attempt of the data failed, further comprising:

scheduling a write operation to copy the data set from the third storage device to the first storage device;

receiving a request to access the data set after scheduling the write operation; and recalling the data set from the third storage device if the scheduled write operation has not yet copied the requested data set to the first storage device, wherein the steps of selecting one of the first and second storage devices to access the data set and accessing the data set occurs if the scheduled write operation of the data set to the first storage device completed.

6. The method of claim 5, further comprising randomly selecting one of the first and second storage devices from which to recall the data set if the requested data set has been copied to the first and second storage devices as a result of the scheduled write operation and if the flags for both storage devices have the same value.

7. The method of claim 1, wherein the data level is maintained for the data set in both the third and fourth storage devices indicating a version of the data set, further comprising determining whether the data set is in both the third and fourth storage devices, wherein accessing the data set from one of the third and fourth storage devices comprises accessing the data set from one of the third and fourth storage devices having the highest data level for the data set.

8. The method of claim 7, further comprising randomly selecting one of the third and fourth storage devices from which to access the data set if the data levels of the data set at both the third and fourth storage devices have the same value.

9. A system for accessing a data set from one of a first, second, third, and fourth storage devices, including a copy of the data set, comprising:

means for maintaining a flag for each of the first and second storage devices indicating whether a previous access attempt of the data set from the first and second storage devices failed;

means for maintaining a data level for each of the plurality of data sets in each of the first and second storage devices indicating a number of times the data set has been updated, wherein there is a separate data level for each copy of one data set in the first and second storage devices and wherein the data levels for the first and second storage devices having copies of one data set are capable of being equal;

means for receiving a request to one data set;

means for accessing the data set from one of the third and fourth storage devices if the data set is in one of the third and fourth storage devices;

means for selecting the first or second storage device having a higher data level if the data levels are not equal and if the data set is not in one of the third and fourth storage devices;

means for selecting the first or second storage device having the flag indicating that no previous access attempt failed if the flag for the other of the first or second storage device indicates that one previous access attempt of the data set from the first or second storage device failed and if the data levels are equal and if the data set is not in one of the third and fourth storage devices;

means for accessing the data set from the selected first or second storage devices;

means for copying the data set from the first storage device to the third storage device when accessing the data set from the first storage device; and means for copying the data set from the second storage device to the fourth storage device when accessing the data set from the first storage device.

10. The system of claim 9, fibs comprising means for using a selection criteria to access one of the first and second storage devices that is unrelated to a value of the flag if the flags for both storage devices have the same value.

11. The system of claim 9, further comprising means for synchronizing the data set on both the first and second storage devices after accessing the data set from the selected storage device.

12. The system of claim 9, wherein the flag and data levels are maintained for each data set in the first and second storage devices and wherein the first and second storage devices have the same data sets.

13. The system of claim 9, wherein the means for accessing the data set comprises recalling the data set and wherein the flag indicates whether a recall attempt of the data failed, further comprising:

means for scheduling a write operation to copy the data set from the third storage device to the first storage device;

means for receiving a request to access the data set after scheduling the write operation; and means for recalling the data set from the third storage device if the scheduled write operation has not yet copied the requested data set to the first storage device, wherein the steps of selecting one of the first and second storage devices to access the data set and accessing the data set occurs if the scheduled write operation of the data set to the first storage device completed.

14. The system of claim 13, further comprising for randomly selecting one of the first and second storage devices from which to recall the data set if the requested data set has been copied to the first and second storage devices as a result of the scheduled write operation and if the flags for both storage devices have the same value.

15. The system of claim 9, further comprising mums for determining whether the data set is in both the third and fourth storage devices, wherein the mean for accessing the data set from one of the third and fourth storage devices comprises accessing the data set from one of the third and fourth storage devices having the highest data level for the data set.

16. The system of claim 15, further comprising means for randomly selecting one of the third and fourth storage devices from which to access the data set if the data levels of the data set at both the third and fourth storage devices have the same value.

17. An article of manufacture for use in programming at least one processing unit to access a data set from one of a first, second, third, and fourth storage devices, including a copy of the data set, the article of manufacture comprising computer readable storage media including at least one computer program embedded therein that causes the at least one processing unit to perform:

maintaining a flag for each of the first and second storage devices indicating whether a previous access attempt of the data set from the first and second storage devices failed;

maintaining a data level for each of the plurality of data sets in each of the first and second storage devices indicating a number of times the data set has been updated, wherein there is a separate data level for each copy of one data set in different the first and second storage devices and wherein the data levels for the first and second storage devices having copies of one data set are capable of being equal;

receiving a request to one data set;

accessing the data set from one of the third and fourth storage devices if the data set is in one of the third and fourth storage devices;

selecting the first or second storage device having a higher data level if the data levels are not equal and if the data set is not in one of the third and fourth storage devices;

selecting the first or second storage device having the flag indicating that no previous access attempt failed if the flag for the other of the first or second storage device indicates that one previous access attempt of the data set from the first or second storage device failed and if the data levels are equal and if the data set is not in one of the third and fourth storage devices; and accessing the data set from the selected first or second storage device;

copying the data set from the first storage device to the third storage device when accessing the data set from the first storage device; and copying the data set from the second storage device to the fourth storage device when accessing the data set from the first storage device.

18. The article of manufacture of claim 17, further comprising using a selection criteria to access one of the that and second storage devices that is unrelated to a value of the flag if the flags for both storage devices have the same value.

19. The article of manufacture of claim 17, further comprising synchronizing the data set on both the first and second storage devices after accessing the data set from the selected storage device.

20. The article of manufacture of claim 17, wherein the flag and data levels are maintained for each data set in the first and second storage devices and wherein the first and second storage devices have the same data sets.

21. The article of manufacture of claim 17, wherein the step of accessing the data set comprises recalling the data set and wherein the flag indicates whether a recall attempt of the data failed, further comprising:

scheduling a write operation to copy the data set from the third storage device to the first storage device;

receiving a request to access the data set after scheduling the write operation; and recalling the data set from the third storage device if the scheduled write operation has not yet copied the required data set to the first storage device, wherein the steps of selecting one of the first and second storage devices to access the data set and accessing the data set occurs if the scheduled write operation of the data set to the first storage device completed.

22. The article of manufacture of claim 21, further comprising randomly selecting one of the first and second storage devices from which to recall the data set if the requested data set has been copied to the first and second storage devices as a result of the scheduled write operation and if the flap for both storage devices have the same value.

23. The article of manufacture of claim 17, comprises accessing the data set from one of the third and fourth storage devices having the highest data level for the data set.

24. The article of manufacture of claim 17, further comprising randomly selecting one of the third fourth storage devices from which to access the data set if the data levels of the data set at both the third and fourth storage devices have the same value.

* * * * *